(12) United States Patent
Bitzer et al.

(10) Patent No.: US 11,767,139 B2
(45) Date of Patent: Sep. 26, 2023

(54) METHOD FOR PRODUCING A PACKAGE

(71) Applicant: KOCH Pac-Systeme GmbH, Pfalzgrafenweiler (DE)

(72) Inventors: Jürgen Bitzer, Horb (DE); Jens Maier, Bad Rippoldsau (DE); Markus Eppler, Herzogsweiler (DE); Frank Helber, Haiterbach (DE)

(73) Assignee: KOCH PAC-SYSTEME GMBH, Pfalzgrafenweiler (DE)

(*) Notice: Subject to any disclaimer, the term of this patent is extended or adjusted under 35 U.S.C. 154(b) by 0 days.

(21) Appl. No.: 17/533,670

(22) Filed: Nov. 23, 2021

(65) Prior Publication Data

US 2022/0161952 A1 May 26, 2022

(30) Foreign Application Priority Data

Nov. 23, 2020 (EP) .................................... 20209304
Aug. 4, 2021 (EP) .................................... 21189693

(51) Int. Cl.
*B65B 51/10* (2006.01)
*B65B 7/28* (2006.01)
*B65B 25/00* (2006.01)
*B65B 57/02* (2006.01)

(52) U.S. Cl.
CPC ............ *B65B 51/10* (2013.01); *B65B 7/2878* (2013.01); *B65B 25/008* (2013.01); *B65B 57/02* (2013.01); *B65B 2051/105* (2013.01)

(58) Field of Classification Search
CPC ..... B65B 7/2878; B65B 25/008; B65B 51/10; B65B 51/14; B65B 57/02; B65B 2051/105; B29C 66/91423
See application file for complete search history.

(56) References Cited

U.S. PATENT DOCUMENTS

| 2005/0077297 | A1  | 4/2005  | Marshbum et al. |
| 2006/0289542 | A1* | 12/2006 | Schedl et al. ........... B29C 66/21  220/359.2 |
| 2007/0059464 | A1  | 3/2007  | Huffer |
| 2014/0331602 | A1* | 11/2014 | Newman ................. B65B 51/14  53/422 |
| 2021/0276755 | A1  | 9/2021  | Bach et al. |

FOREIGN PATENT DOCUMENTS

| DE | 20309243 U1 * | 8/2003 | ............. B65D 75/36 |
| DE | 102016117834 A1 | 3/2018 | |
| JP | S62251327 A * | 11/1987 | ......... B29C 66/3472 |
| JP | 2002154577 A * | 5/2002 | |
| JP | 2003226365 A * | 8/2003 | |
| JP | 2006021794 A * | 1/2006 | |
| WO | 2022053574 A1 | 3/2022 | |
| WO | 2022053586 A1 | 3/2022 | |

* cited by examiner

*Primary Examiner* — Stephen F. Gerrity
(74) *Attorney, Agent, or Firm* — Dickinson Wright PLLC

(57) ABSTRACT

A method for producing a package which has a formed part with a product cavity, and a lidding film covering the product cavity. According to the method, a seam is defined, the seam is divided into sections, a pull-off force for pulling the lidding film from the formed part at least for a first section is determined, and the lidding film is sealed to the formed part. The sealing temperature for the first section is selected based on the pull-off force.

15 Claims, 5 Drawing Sheets

METHOD FOR PRODUCING A PACKAGE

RELATED APPLICATIONS

The present disclosure claims priority to and the benefit of European Application 21189693.1, filed on Aug. 4, 2021, and also claims priority to and the benefit of European Application 20209304.3, filed on Nov. 23, 2020, the entire contents of each of which are incorporated herein by reference.

FIELD

The present disclosure relates to a method for producing a package, in particular a heat-sealed plastic package, such as a package for contact lenses.

BACKGROUND

For the packaging of products, packages are often used which comprise a product cavity in a formed part, this product cavity then being sealed by a lidding material. After the product cavity has been filled with a product, the lidding material is sealed to the formed part along a seam, which surrounds the product cavity. US 2021/0276755 A1, for example, discloses a sealing tool for producing a seam, wherein this sealing tool comprises at least two heating conductors for heating subsections of a heating element, which are actuatable in different ways. As a result, a temperature profile can be generated over the surface of the heating element in order to set the local sealing temperature precisely.

A quality feature of such packages is the size and shape of the seam, which shall guarantee a strong bond between the formed part and the lidding material and leak-tightness of the sealed product cavity not only immediately after production but also over a certain product life cycle or shelf life. At the same time, it is desired for the package to be opened in a user-friendly fashion. If the lidding material is sealed too strongly to the formed part in order to achieve a tight bond, it may be possible that the seam cannot be broken open, in particular at the beginning of the opening process, or that an excessive amount of force is required to open the seal initially and to tear off the lidding film from the formed part. This can also have the effect that the lidding film is jerked off or torn off abruptly as soon as the necessary force is applied, wherein the contents of the package can be lost.

Various possibilities for varying the strength of the seal are therefore known from the prior art. For example, DE 203 09 243 U1 describes a blister pack, in which a lidding material of cardboard is sealed to a blister by means of an adhesive sealing medium. Means for reducing the adhesive strength are applied to the sealing medium to form a defined number of weakly sealed zones or zones which are not sealed at all along the seam. The means for reducing the adhesive strength can be in the form of a coating or a covering material. According to US 2007/0059464 A1, a coating for reducing the strength of the seal is applied to the sealing surface. In both cases, the sealing surface must be treated in advance with an additional material.

Another approach is disclosed in US 2005/0077297 A1, according to which the seam is made narrower in the area where it is to be opened, as a result of which less force must be applied to open it.

BRIEF SUMMARY

It is an object of the present disclosure to provide a method offering a simple and low-cost way of producing a package, which is securely sealed but is easy to open at the same time.

According to an aspect of the present disclosure a method for producing a package, in particular a heat-sealed plastic package, comprising a formed part having at least one product cavity, and a lidding film covering the at least one product cavity, comprises the steps of:

(a) defining a seam to be produced, along which the lidding film is to be sealed to the formed part around the at least one product cavity;

(b) dividing the seam to be produced into a plurality of sections, which comprise at least a first section and a second section;

(c) determining, at least for the first section of the plurality of sections, a first pull-off force for pulling the lidding film from the formed part; and (d) sealing the lidding film to the formed part along the seam by means of a sealing device with a first sealing temperature in the first section and a second sealing temperature in the second section, wherein the first sealing temperature and the second sealing temperature are different, and wherein at least the first sealing temperature for the first section is selected based on the first pull-off force defined according to step (c).

In this way, the pull-off force and thus the opening behavior of the package can be adjusted effectively and particularly easily, in particular without any additional means or any changes in the package design, by sealing with different sealing temperatures in defined sections of the seam. Without great effort, it can be ensured, first, that the seam and thus the package are sufficiently leakproof and, second, that the package is easy to open.

The sealing operation is preferably carried out by thermal sealing, i.e. heat-sealing. In this case, the seam corresponds to a heat-sealed joint. For this purpose, the sealing device may comprise a sealing contour, which preferably contacts the lidding film or the formed part and introduces the heat required for producing the seam. The sealing device may comprise a heater, in particular an electrical resistance heater, for heating the sealing contour.

The sealing process according to step (d) is largely determined by process parameters including a sealing pressure, a sealing duration, and a sealing temperature. For these process parameters, appropriate nominal values are usually preset as a function of the pairing of the material of the formed part with that of the lidding film and as a function of the requirements on the seam.

The sealing pressure is preferably between 0.1 and 1 N/mm$^2$, more preferably between 0.3 and 0.6 N/mm$^2$. The sealing duration is preferably between 0.4 and 1.5 sec, more preferably between 0.8 and 1.2 sec. The sealing temperature is preferably between 150 and 250° C., more preferably between 180 and 230° C.

The formed part can comprise exactly one product cavity or, in an analogue manner, a plurality of product cavities. It is preferred, however, that one seam is provided around each of the product cavities to properly seal each product cavity. In other words, one seam preferably circumscribes only one product cavity. In general, several formed parts can be arranged next to each other for sealing, each formed part having at least one product cavity, wherein, also in that case, a seam preferably surrounds each product cavity. The sealing device may comprise a plurality of sealing contours corresponding to the number of product cavities and, consequently, to the number of seams to be produced. The method according to the disclosure is therefore directly applicable to these embodiments as well. If, in the following, it is referred to a seam and a corresponding product cavity, the features described in relation thereto are applicable to an embodiment comprising a plurality of product cavities as well.

Generally, the formed part can be in the form of a web, such as a film web, preferably of a thermoplastic film. The method preferably comprises, before step (d), the steps of forming, in particular thermoforming, at least one product cavity in the film web, and of filling each product cavity with a product. The step of (thermo-) forming may comprise the steps of providing the film web, heating the film web by means of a heating device, and forming the at least one product cavity into the film web by means of a forming device. In step (d), the lidding film, which is preferably also present in the form of a sheet or web, is sealed to the formed film web. Blister packs for medicinal or pharmaceutical products, for example, are often produced in this way.

Alternatively, the formed part may be provided to the sealing operation according to step (d) as a separately made, individual part having one or more product cavities. For example, the formed part may have been stamped or cut out of a larger unit such as a formed film web or, as is usually the case with contact lens packages, the formed part may be formed by injection-molding. In this case, the method preferably comprises, prior to step (d), the steps of forming the formed part by injection molding and filling of the at least one product cavity of the formed part with a product.

The formed part is preferably made of plastic, in particular polypropylene. The lidding film is preferably made of a plastic film or a metal foil and can also have a multi layered configuration.

The at least one product cavity is preferably configured as a (blister) pocket in the formed part. The package can, for example, be a blister pack with one blister pocket or a plurality of blister pockets receiving medicinal or pharmaceutical products. The package can also be a contact lens package having a pocket or a plurality of pockets, each of which receiving a contact lens and a fluid.

Each product cavity preferably contains one product and/or a fluid as is the case with pharmaceuticals or cosmetics. If the package is a contact lens package, for example, the at least one product cavity contains a contact lens and a liquid solution, which surrounds the contact lens. If the at least one product cavity contains a fluid, such as the liquid solution, the requirements on the leakproof properties of the product cavity sealed by the seam are stringent. At the same time, there is a danger that fluid will spill out if the package is not easy to open. As described herein, the strength of the seam may be optimized section by section under consideration of these requirements.

Generally speaking, the formed part may comprise a flange, which surrounds the at least one product cavity. The flange may provide a sealing surface, on which the lidding film is sealed to the formed part. The seam, which surrounds the at least one product cavity, is therefore preferably formed on the flange.

Defining the seam according to step (a) comprises in particular defining of a size and a shape of the seam, more particularly a course of the seam around the product cavity, a length of the seam, and a width of the seam. The step of defining the seam is usually carried out once for a certain type and configuration of package, e.g., during the design and layout of the package, and is then adopted for all packages to be produced similarly.

Each seam around a product cavity preferably comprises a length of between 10 and 1,200 mm, more preferably between 25 and 600 mm, and even more preferably between 50 and 150 mm. The sealing contour preferably comprises a corresponding length. The width of each seam is preferably substantially constant.

The sealing contour of the sealing device preferably comprises a shape, which corresponds to the shape of the seam, in particular with respect to the course of the seam around the product cavity. As a result, the heat input provided by the sealing device for sealing according to step (d) is effectively directed to the area of the seam to be formed.

In a preferred embodiment, the seam and the sealing contour are substantially ring-shaped. The seam therefore forms a closed shape and extends around the product cavity. Preferably, the sealing contour forms a closed shape and is configured to extend around a central area in which the sealing device has no sealing contour. The substantially ring-shaped sealing contour is therefore configured in such a way that, on contact with the lidding film, it completely surrounds the product cavity in the formed part. The substantially ring-shaped form of the sealing contour and of the seam is not limited to a circular ring but also comprises any desired circumferential shapes such as ellipses, polygons, and other preferably curved shapes which can surround the product cavity. In the case of a ring-shaped configuration, the length of the seam or of the sealing contour corresponds to the circumference of the seam or sealing contour, preferably along a center line of the seam or sealing contour.

Dividing the seam into a plurality of sections according to step (b) serves preferably to divide the seam into sections in which different requirements on the seam are of primary interest. Thus, in the subsequent step (c), an appropriate pull-off force at least for the first section can be determined in correspondence with the given requirements.

The sections of the plurality of sections are preferably arranged directly adjacent to each other, such that the entire seam is divided into sections. Dividing the seam into a plurality of sections does not imply that the sections of the plurality of sections must be physically/structurally divided or separated from each other. The division of the seam into the plurality of sections may also be "imaginary" according to the requirements and the function of the seam in the respective section.

The lidding film is intended to be pulled off from the formed part in a pull-off direction. The pull-off direction is preferably defined in one plane with the seam. The pull-off direction is further defined as beginning from a first point, at which the lidding film is separated first from the formed part when the package is being opened, to a second point, at which the lidding film is connected to the formed part for the longest period of time as the package is opened. The pull-off direction can be predetermined by the shape and layout of the package. For example, the lidding film preferably comprises a tear-open tab, which is to be pulled to open the package and which thus defines the first point. In addition, the pull-off direction may be affected by the geometry of the seam and its strength.

The plurality of sections of the seam, in particular the first and second sections, are preferably arranged one behind the other in the pull-off direction. The first section can be arranged in front of the second section, relative to the pull-off direction. In this case, as the package is being opened, the lidding film is separated from the formed part first in the first section and then in the second section of the seam. Different requirements on the configuration of the seam, i.e. requirements associated with opening the package in the first section and with pulling-off the lidding film in the second section, can thus be taken into account.

The plurality of sections may comprise more than the first and second sections. Each section of the plurality of sections may be sealed with an individual temperature, which can differ from the sealing temperature of at least some or of all other sections as will be described below in greater detail.

In a preferred embodiment, step (c) comprises determining, i.e. defining, a pull-off force for pulling the lidding film from the formed part for each section of the plurality of sections. That is, besides determining a first pull-off force for the first section, the method according to step (c) comprises determining a second pull-off force for the second section and a further pull-off force for any further section. Of course, a pull-off force may also only be determined for some of the plurality of sections which are of particular interest.

In one embodiment, the plurality of sections comprises at least the first, the second, and a third section. Here, the first section is a tear-open section, in which the lidding film is to be separated first from the formed part as the package is being opened. The lidding film may comprise a tear-open tab in an area of the lidding film assigned to the first section. The tear-open tab may thus be arranged in close proximity to and, preferably, in contact with the first section of the seam. The second section may be a pull-off section, which is arranged between the first and third sections and in which, to open the package, the lidding film is to be pulled away in the pull-off direction from the first section toward the third section. The third section may be an end section, which is arranged behind the first and second sections, with respect to the pull-off direction, and in which the lidding film is connected to the formed part for the longest period of time as the package is being opened. Preferably, a third sealing temperature for the third section differs from the first and/or second sealing temperatures. At least in these sections, the requirements on the seam of the package differ in most cases, for which reason it is particularly advantageous for the required pull-off force in these sections to be adjusted accordingly. Any desired coarser or finer divisions of the seam are however possible.

In particular, the pull-off force is defined herein as a force required to separate the lidding film from the formed part. The skilled person is familiar with a peeling force, which designates the average force necessary to separate a peel system. A peel system comprises two components, in particular plastic films or metal foils, which are adhered separably to each other. In the present case, the lidding film and the formed part, which are connected to each other by the seam, may form a peel system.

The peeling behavior of the peel system can be characterized by means of, for example, a fixed-arm peel test based on the proposed standard ESIS TC4, "Peel Testing of Flexible Laminates" or on ASTN F88/F88M "Standard Test Method for Seal Strength of Flexible Barrier Materials". For packages containing medicinal products, such as contact lens packages, the requirements are set down in, for example, DIN 868-5:2019-03.

During the peel test, the lidding film is pulled off the formed part by a tensile strength testing machine (tension machine), and a peeling force-displacement diagram is recorded, wherein the displacement corresponds to a length of separation of the lidding film and formed part, which is also referred to as a separation length. Normally, the peeling force curve in a diagram of this type has an initial peak and another peak at the end, between which a characteristic plateau is formed. For the measured variable of the peeling force, usually only this characteristic plateau between 10% or 20% and 80% or 90% of the separation length is used. A peeling force curve of this type may be obtained in the case of packages of the type described herein, particularly when the sealing parameters (temperature, pressure, time) are constant along the seam and the sealing strength along the seam is also constant.

The pull-off force described herein corresponds substantially to a peeling force. However, due to its effect on the opening characteristic of the package, the entire force curve shall be considered and adapted as desired. The values of the pull-off force given herein are to be determined on the basis of the previously described standards in a fixed-arm peel test, wherein the formed part of the package is inserted into an appropriate holder, the lidding film is pulled off at an angle (peel angle) of 135° to the package, and the pulling speed of the tension machine is set to 254 mm/min (10 in/min).

By determining at least the first pull-off force of the first section of the seam according to step (c) and sealing the lidding film to the formed part with at least the first sealing temperature being selected based on the first pull-off force according to step (d), it is now possible to define the course of the pull-off force as desired by selecting the settings of the sealing device accordingly.

For example, dividing of the seam to be produced into a plurality of sections according to step (b) may comprise the steps of:
  (b1) determining a reference curve, which is characteristic of a change in a reference pull-off force of a reference package versus a length, in particular the separation length, in the pull-off direction; and
  (b2) determining the plurality of sections based on the reference curve and dividing the seam into the plurality of sections correspondingly.

The reference curve corresponds to the peeling force-displacement diagram as described above and thus to a force curve of a (reference) pull-off force of the reference package. The reference curve can be obtained from the layout and design phase of the package, from experiments, or from simulations.

The reference package is preferably configured in the same way as the package to be produced, in particular in the same way with respect to the course and configuration of the seam and the material combination of lidding film and formed part. The reference package may have been produced with initial process parameters, in particular with an initial sealing temperature. The reference package, however, can also have been produced with process parameters which have already been adapted, in particular with an adapted sealing temperature or sealing temperature distribution.

Determining, i.e. defining, the plurality of sections based on the reference curve according to step (b2) may comprise the step of defining boundaries between the sections based on the separation length taken from the diagram of the reference curve, on the basis of which the seam is to be divided into the plurality of sections. In particular, step (b2) can comprise the steps of detecting critical areas of the reference curve and determining the plurality of sections in correspondence with the critical areas of the reference curve.

Determining the pull-off force according to step (c) can be understood as defining or determining a predetermined pull-off force, in particular a nominal value, a minimum value, or a maximum value of the pull-off force. Because the pull-off force along the seam can vary within a section of the seam and is usually not constant, defining a minimum value, a maximum value, or a tolerance range around the nominal value, for example, is preferred. As already mentioned, it is particularly preferable a pull-off force is determined for each section of the plurality of sections according to step (c).

Determining the pull-off force according to step (c) may comprise the step of defining a maximum pull-off force, in particular defining a maximum first pull-off force for the first section. If, as described above, the first section is the first of several sections in the pull-off direction in which the package is initially opened, the first pull-off force in the first section should not exceed a maximum pull-off force to ensure that it will be easy for anyone to open the package. This is even more relevant when the force curve of the pull-off force comprises the initial peak in an area corresponding to the first section of the seam, which makes it more difficult to open the package and leads to the risk that the package will be jerked as it is being opened. Of course, the first pull-off force should not be below a predetermined minimum first pull-off force, so that the integrity of the package remains ensured during production and transport and guarantees sufficient leaktightness. Obviously, a maximum pull-off force may also be defined for each of the plurality of sections.

In addition or as an alternative, determining the pull-off force according to step (c) may comprise the step of defining a minimum pull-off force, in particular defining a minimum second pull-off force for the second section. When the second section is arranged behind the first section relative to the pull-off direction, it is likely that the force curve of the pull-off force for the second section lies in the area of the characteristic plateau. Therefore, the second pull-off force would usually be lower than the first pull-off force. The second pull-off force in the second section should, however, not fall below a minimum pull-off force, so that the integrity of the package during production and transport is ensured and adequate leaktightness is guaranteed. Of course, the second pull-off force should also not exceed a maximum second pull-off force so that the package can be opened easily. Obviously, a minimum pull-off force may also be defined for each of the plurality of sections.

In the example described above, in which the plurality of sections also comprises the third section as an end section, determining a pull-off force according to step (c) may comprise defining a minimum and/or a maximum third pull-off force for the third section. If the lidding film is to be removed completely from the formed part, it is preferred that step (c) comprises the step of defining a maximum third pull-off force, in particular when the force curve of the pull-off force for the third section comprises the final peak. As a result, the lidding film will be more easily removable from the formed part since the third pull-off force will not exceed the predetermined maximum value. Cases are also conceivable, however, in which it is desirable that it be impossible to remove the lidding film completely from the formed part. In this case, step (c) may comprise the step of defining a minimum third pull-off force. The minimum third pull-off force can then be set at such a high level that the lidding film cannot be removed manually.

In a preferred embodiment, the first pull-off force and/or the second pull-off force are between 2 N and 15 N, more preferably between 5 N and 10 N. In the case of an end section, e.g. the third section, the third pull-off force is preferably more than 10 N, more preferably more than 15 N, even more preferably more than 20 N.

Determining at least the first pull-off force for the first section and preferably a pull-off force for each of the plurality of sections according to step (c) may be performed as a function of a geometry of the seam. For example, the seam in the first section extends farther in a direction transversely to the pull-off direction than it does in the second section. In the third section, the seam can also extend farther transversely to the pull-off direction than it does in the second section. Thus, a different sealing strength and different sealing temperatures may be required in these sections to achieve the desired pull-off force.

Determining the pull-off force for at least one section of the plurality of sections according to step (c) can also be performed based on the previously described reference curve of the reference package. In this embodiment, step (c) may further comprise the steps of:

(c1) defining an area of the reference curve, in which the reference pull-off force lies out-side a tolerance range;

(c2) determining the section of the plurality of sections of the seam, which corresponds to the area in which the reference pull-off force lies outside the tolerance range; and (c3) determining the pull-off force for the section of the seam determined according to step (c2), such that the pull-off force of this section lies within the tolerance range.

In general, the section determined according to step (c2) for which a pull-off force is then determined according to step (c3) may be designated the first section irrespective of its location along the seam. Of course, more than one area may be defined according to step (a) if the reference pull-off force lies outside the tolerance range in more than one portion of the curve.

Referring now to the characteristic force-displacement curve described above, for example, it may be found in step (c1) that the initial peak of the reference curve lies above a predetermined maximum value. According to step (c2), the section of the seam can then be determined in which the initial peak occurs. The pull-off force for this section is then defined in such a way that it lies below the predetermined maximum value (step (c3)).

Step (d) preferably comprises the step of setting sealing temperatures of the sealing device for producing the seam. The sealing device is therefore preferably configured to generate different temperatures along the seam, as will be described in detail below with reference to the sealing device.

At least for the first section, for which the first pull-off force was determined according to step (c), a first sealing temperature of the sealing device is set based on the first pull-off force determined according to step (c). A pull-off force according to step (c) is preferably set for each section of the plurality of sections, and therefore a sealing temperature may also be set for each section based on the determined pull-off force. In order to adapt the pull-off force and in particular the course of its change along the seam in accordance with the given requirements, at least the first sealing temperature for the first section preferably differs from the second sealing temperature for the second section. A third sealing temperature for the third section can differ from the first and/or the second sealing temperatures.

Setting the sealing temperatures of the sealing device may comprise (i) setting a sealing temperature for each section of the plurality of sections independently of the other sections, (ii) setting a temperature difference between one section of the plurality of sections and one or more other sections of the plurality of sections, or (iii) setting a temperature ratio between two sealing temperatures, in particular between the first and second sealing temperatures.

For example, step (c) may comprise the step of defining a necessary change in the pull-off force in a section of the plurality of sections, and step (d) may then comprise the step of setting the sealing temperatures of the sealing device according to a change in the sealing temperatures correlating with the required change in the pull-off force.

The method may also comprise the steps of determining a necessary sealing strength as a function of the pull-off force determined according to step (c) for at least the first section of the plurality of sections, determining of each sealing temperature as a function of the determined sealing strength, and setting the sealing device according to the determined sealing temperatures. For example, the sealing strength and the sealing temperature are greater in the second section than in the first and third sections.

The steps of the method, in particular steps (b) and (c), and also the setting of the sealing device according to step (d) as well as their respective sub-steps, if any, can be carried out independently of each other by means of a data processing device, such as a computer. The data processing device can be a control unit of the sealing device or a computer substantially independent of the sealing device, this computer being separate from the control unit or communicatively connected to it.

In the following, the sealing device for sealing the lidding film to the formed part is described.

The sealing device may comprise the sealing contour for producing the seam. The sealing contour is preferably divided into a plurality of segments, wherein at least a first segment of the plurality of segments is assigned to the first section of the seam, and at least a second segment of the plurality of segments is assigned to the second section of the seam. Preferably, at least one segment of the plurality of segments of the sealing contour is assigned to each section of the plurality of sections of the seam. Step (d) may then further comprise the step of heating the plurality of segments in accordance with the sealing temperatures, in particular with the first and second sealing temperatures. It is also possible for several segments of the plurality of segments of the sealing contour to be assigned to one section of the seam. Setting the sealing temperatures of the sealing device can, in this case, comprise setting the temperatures of each of the plurality of segments.

The plurality of segments of the sealing contour preferably comprises at least four, more preferably at least six, even more preferably at least twelve segments. To arrive at a good compromise with regard to the complexity of the sealing device, the number of segments of the plurality of segments is preferably no more than 28, more preferably no more than 22, even more preferably no more than 16 segments. It is obvious that any desired number of segments can be selected, preferably from the given ranges, as appropriate.

Each segment of the plurality of segments can heat the lidding film for sealing purposes according to step (d) substantially independently of the other segments of the plurality of segments. In this case, the segments of the plurality of segments are therefore individually actuatable. The sealing device preferably comprises a plurality of heating elements and a plurality of sensor elements, wherein one heating element and one sensor element are assigned to each segment of the plurality of segments.

Preferably, each heating element of the plurality of heating elements is configured to heat one segment of the plurality of segments of the sealing contour for the sealing process according to step (d). The sensor elements of the plurality of sensor elements can, for example, detect the temperature in each segment. A heating element of the plurality of heating elements and a sensor element of the plurality of sensor elements can be combined to form an integral unit. This is possible, for example, when the heating elements are configured as wires or as strip conductors and thus form an electrical resistance heater. Via the electrical resistance of a heating element of this type, which changes with temperature, it is possible simultaneously to determine the temperature of the heating element. The heating element can therefore also be considered a sensor element, e.g. for the resistance, the temperature, or the wattage.

Dividing the sealing contour into a plurality of segments does not imply that the segments of the plurality of segments must be physically/structurally divided or separated from each other on a side facing the lidding film. The division of the sealing contour into the plurality of segments can also be "imaginary" and may be determined by, for example, the function of the sealing device and/or, in particular, by other components such as the number of heating elements.

Corresponding to the shape of the sealing contour, the plurality of segments of the sealing contour is preferably arranged in accordance with the shape of the seam, as a result of which the lidding film and the formed part are effectively heated in the area of the seam to be produced. Preferably only one side of the sealing contour, i.e., the side facing the lidding film, comes into contact with the lidding film during step (d). The segments of the plurality of segments of the sealing contour are preferably arranged directly adjacent to each other. Moreover, the segments of the plurality of segments are preferably arranged continuously along the sealing contour. The plurality of segments can therefore be arranged consistently along the sealing contour or seam.

The sealing device may also comprise the control unit. The control unit can be configured to perform step (c) and to control the sealing device according to step (d).

In a preferred embodiment, the sealing device further comprises a carrier substrate, which is made in particular of ceramic material. The plurality of heating elements and the plurality of sensor elements can be provided on a side of the carrier substrate facing the lidding film. The plurality of heating and/or sensor elements can be formed by wires or strip conductors, which are applied to the carrier substrate. Strip conductors can be vapor-deposited or printed directly onto the carrier substrate.

To protect the plurality of heating elements and the plurality of sensor elements, a protective layer may be provided, which covers the heating elements and the sensor elements on the side facing the lidding film. The protective layer can be a thin plate, which covers the heating and sensor elements. The protective layer, however, can also be a cover layer on the carrier substrate, into which the heating and sensor elements are embedded. Preferably, at least the protective layer forms the sealing contour. Alternatively, the carrier substrate equipped with the heating and sensor elements or a separate sealing component arranged on the carrier substrate or on the protective layer can also form the sealing contour.

DETAILED DESCRIPTION

Figure 1:
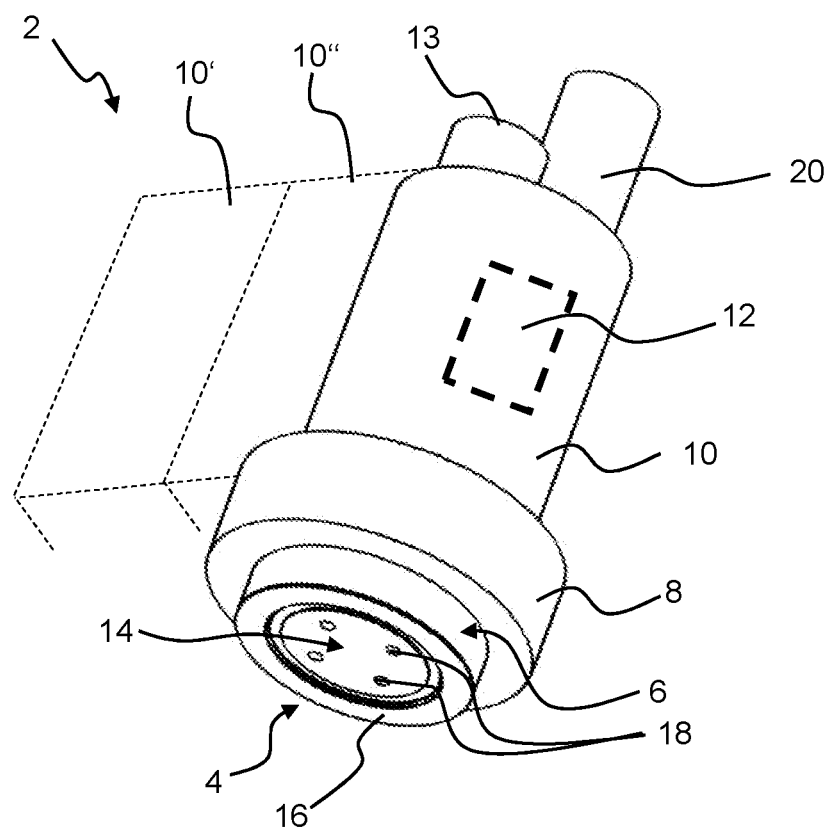
FIG. 1 shows a perspective view of an embodiment of a sealing device for producing a package.

FIG. 1 shows a perspective view of an embodiment of a sealing device 2. The sealing device 2 comprises a sealing contour 4, which is configured to come in contact with a lidding film of a package to be sealed (see FIG. 4). For heat-sealing the lidding film to a formed part of the package to be sealed, the sealing device 2 comprises a heater 6, which heats the sealing contour 4 and is thus in thermally conductive contact with the sealing contour 4. The heater 6 can be connected by means of an insulating body 8 of the sealing device 2 to a housing 10 of the sealing device 2. The insulating body 8 insulates the housing 10, the components accommodated therein, and the rest of the sealing device 2 thermally from the heater 6, so that the heat it generates is conducted effectively to the sealing contour 4.

A control unit 12 for the open-loop and/or closed-loop control of the sealing device 2 can be accommodated in the housing 10, for example. The control unit 12 is connected to the heater 6. The control unit 12 and the heater 6 can be supplied with power and possibly other control signals by way of a terminal 13. It is also conceivable that the control unit 12 could be provided outside the housing 10 and that the control signals could be transmitted to the heater 6 over an appropriate line connected to the terminal 13 or wirelessly.

As shown in FIG. 1, the sealing contour 4 is substantially ring-shaped and encloses a central area 14, where the sealing device 2 does not have a sealing contour 4. The sealing contour 4 preferably has a shape which corresponds substantially to the shape of the seam to be produced (see FIGS. 3-5), as a result of which the heat input from the sealing device 2 can be effectively directed and concentrated to the area of the desired seam. The sealing contour 4 can project beyond other components and areas, in particular beyond the central area 14. In the embodiment shown, this is achieved in that the sealing contour 4 comprises a protective layer 16, which protects the heater 6 and is made of a material having good thermal conductivity. The sealing contour 4, however, can also be configured as an integral part of the heater 6, which then has a corresponding profile.

The sealing device 2 may further comprise at least one suction opening 18 for drawing up the lidding film, thereby enabling the sealing device 2 to arrange the lidding film on the formed part prior to sealing. Here, the sealing device 2 comprises a plurality of such suction openings 18, which are connected to a source of negative pressure, such as a vacuum pump, by way of an appropriate connector 20 on the housing 10 and which are arranged within the sealing contour 4 in the central area 14 of the sealing device 2.

In one embodiment, the sealing device 2 may be configured to seal a plurality of packages or one package having a plurality of product cavities and seams at the same time. In this case, the sealing device 2 comprises a plurality of sealing contours 4 corresponding to the number of product cavities, as indicated in FIG. 1 by the housings 10' and 10" shown in broken line by way of example, on each of which a sealing contour and a heater configured analogously to that of the previously described sealing device 2 are provided.

Figure 2:
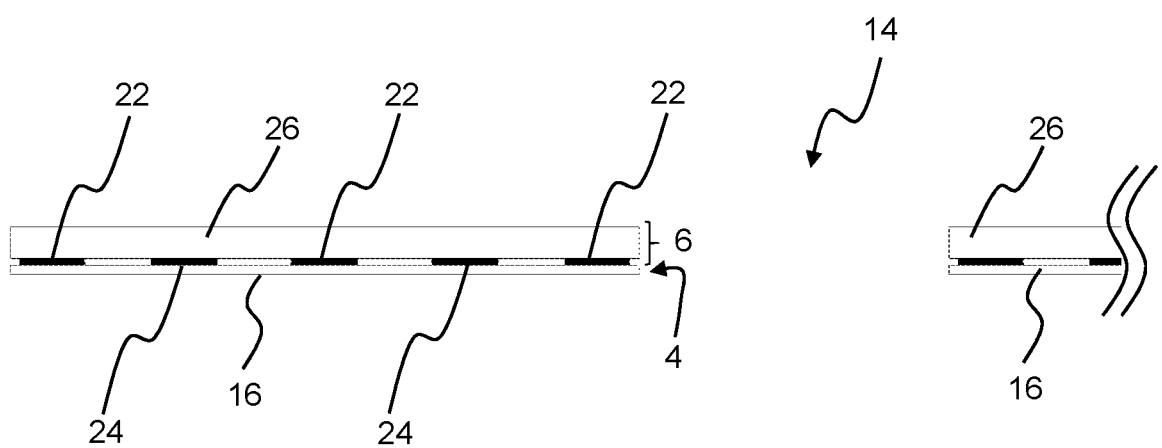
FIG. 2 shows a schematic cross-sectional view of part of the sealing device according to FIG. 1.
Figure 3:
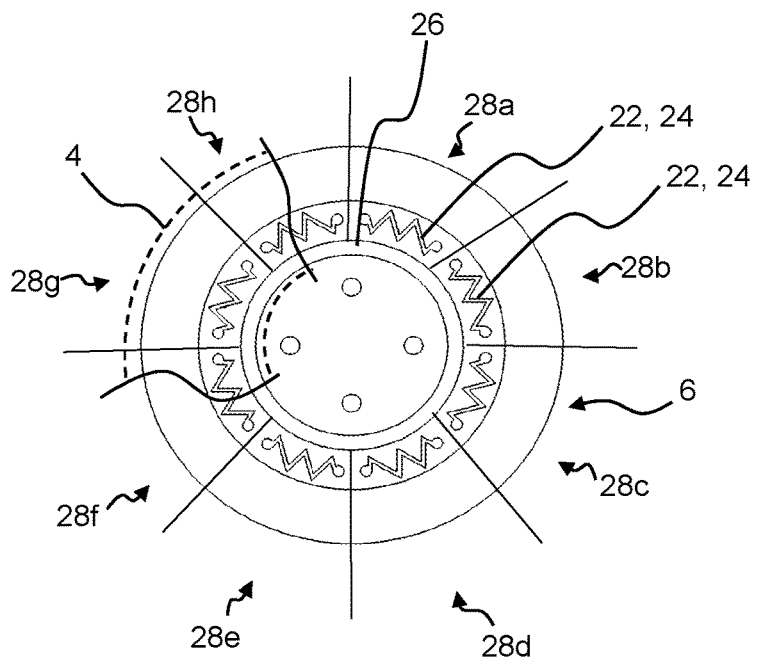
FIG. 3 shows a schematic top view of the sealing device according to FIG. 1.

FIGS. 2 and 3 show details of the sealing device 2, in particular of the heater 6. The sealing device 2, namely the heater 6 of the sealing device, preferably comprises a plurality of heating elements 22 for heating the sealing contour 4. The sealing device 2 may further comprise a plurality of sensor elements 24, which are preferably configured to detect the temperature of the heating elements 22 and/or of the sealing contour 4. The plurality of heating elements 22 and the plurality of sensor elements 24 can be configured as strip conductors, respectively, but may also be formed by wires. The plurality of heating elements 22 and the plurality of sensor elements 24 may be applied to a carrier substrate 26. For example, the strip conductors could be printed on a side of the carrier substrate 26 facing the lidding film, i.e., the side of the carrier substrate 26 facing away from the insulating body 8. The carrier substrate 26 is preferably made of ceramic material. As a result, a highly dynamic heater 6 with effective local control is provided. The protective layer 16 can cover the plurality of heating elements 22 and the plurality of sensor elements 24 to protect them from wear, as shown in FIG. 2. In the top view according to FIG. 3, the sealing contour 4 and protective layer 16 are shown only partially, in dashed line, so that the heating elements 22 can be seen more clearly.

In the embodiment according to FIG. 2, the heating elements 22 of the plurality of heating elements 22 are formed separately from the sensor elements 24 of the plurality of sensor elements 24, e.g., by separate wires, strip conductors, or sensors.

In the embodiment according to FIG. 3, one heating element 22 and one sensor element 24 are configured as an integral unit, here, for example, as a single strip conductor. That is, each of the plurality of heating elements 22 is combined with one of the plurality of sensor elements 24 in an integral element. This can be achieved, for example, in that the plurality of heating elements 22 are electrical resistance heaters. Consequently, their resistance changes as a function of temperature, the temperature thus being detectable on the basis of the resistance of the heating element 22. Unless otherwise described, either of the two embodiments can be used as desired and combined with any of the other features of the sealing device 2 described herein.

As can be seen from a consideration of FIGS. 1 and 3 together, the sealing contour 4 is divided into a plurality of segments 28. In the exemplary embodiment shown in FIG. 3, the plurality of segments 28 comprises eight segments 28*a*, 28*b*, 28*c*, 28*d*, 28*e*, 28*f*, 28*g*, 28*h*. The sealing contour 4 does not have to be divided structurally into segments 28*a-h*. For example, the sealing contour 4 can, as shown, be divided "imaginary" into the segments 28*a-h* in correspondence with the arrangement of the plurality of heating elements 22, so that each segment 28*a-h* comprises one heating element 22 of the plurality of heating elements 22 and preferably one sensor element 24 of the plurality of sensor elements 24. The segments 28*a-h* preferably are arranged directly adjacent to each other and continuously along the sealing contour 4. Each heating element 22 heats a corresponding segment 28*a-h* of the sealing contour 4 assigned to it, and each sensor element 24 monitors a corresponding segment 28*a-h* of the sealing contour 4 assigned to it, in particular its temperature. As a result, each segment 28*a-h* of the plurality of segments 28 can be actuated and monitored individually.

Figure 4A:
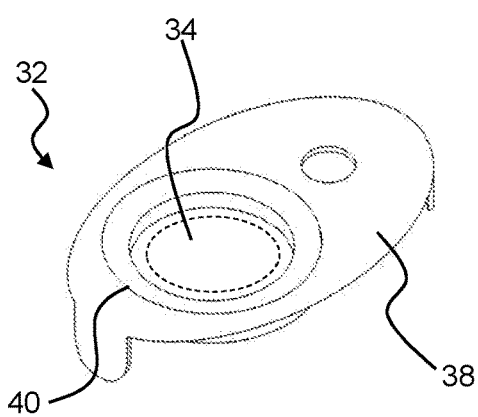
FIGS. 4*a* and 4*b* show perspective views of an exemplary embodiment of a package with and without a lidding film.
Figure 4B:
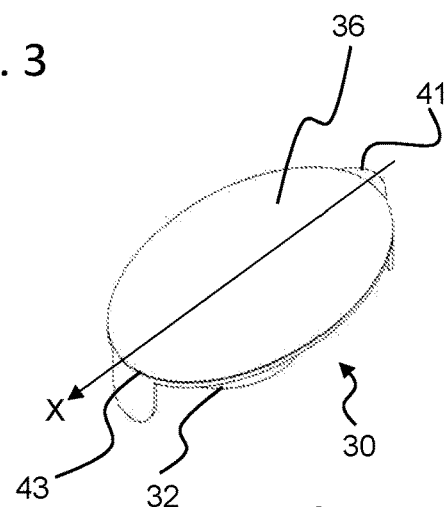

FIGS. 4*a* and 4*b* show perspective views of a package 30, which can be produced by means of the sealing device 2 and method described herein. The package 30 comprises a formed part 32, in which a product cavity 34 has been formed, and a lidding film 36, which is sealed to the formed part 32. For the sake of illustration and clarity, the lidding film 32 is shown only in FIG. 4b, whereas, in FIG. 4a, it has been omitted to reveal the features underneath. The formed part 32 can be an injection-molded part, as used, for example, for the packaging of contact lenses, or it may be a blister pack, as used, for example, for the packaging of pharmaceutical products. The product cavity 34 is preferably configured as a pocket in the formed part 32 and preferably receives a product and/or a fluid (not shown). The formed part 32 preferably comprises a flange 38, which surrounds the product cavity 34 and contacts the lidding film 36.

The lidding film 36 is sealed to the formed part 32 along a seam 40, which surrounds the product cavity 34. For this purpose, the flange 38 may provide a sealing surface, on which the seam 40 is formed.

The lidding film 36 comprises a first, free area 41, which is not connected to the formed part 32, and which is also called a tear-open tab 41. The tear-open tab 41 can be gripped by a user to pull the lidding film 36 away from the formed part 32. A pull-off direction, in which the lidding film 36 is to be pulled to open the package 30, is indicated in FIG. 4b by the arrow X. The pull-off direction X extends from the tear-open tab 41 toward an end section 43 of the lidding film 36. The end section 43 is the section which remains connected to the formed part 32 for the longest period of time when the package 30 is being opened, or it can even be permanently connected to the formed part 32.

Figure 5:
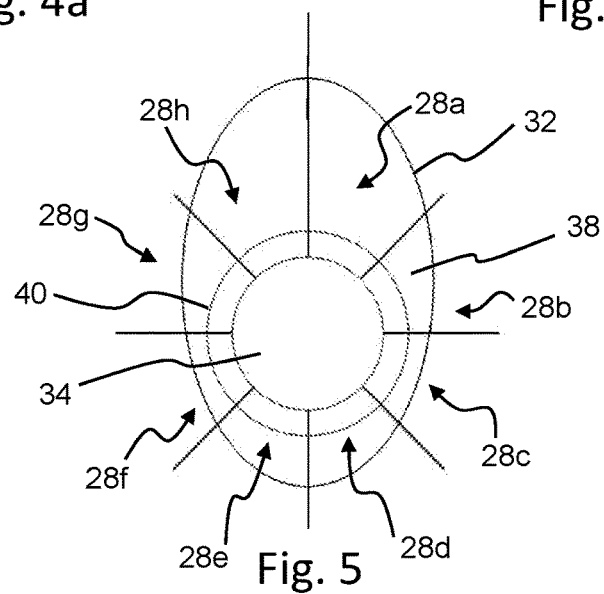
FIG. 5 shows a top view of a formed part of the package according to FIG. 4.

FIG. 5 shows a top view of the formed part 32 of the package 30, wherein, for the sake of illustrating the seam 40 surrounding the product cavity 34, the lidding film 36, which is sealed to the formed part 32 along the seam 40, is not shown. The seam 40 completely surrounds the product cavity 34 to seal off the product cavity 34 in a leak-proof fashion. As can be derived from FIGS. 3 and 5 in combination, the seam 40 and the sealing contour 4 of the sealing device 2 preferably have corresponding shapes.

For the sake of a better understanding, the division of the plurality of segments 28 of the sealing contour 4, which contacts the lidding film 36 to form the seam 40, is also indicated in FIG. 5. As can be seen, the seam 40 can be divided into a plurality of sections A1, A2, A3 (see FIG. 7), to each of which one or more segments 28a-h of the sealing contour 4 can be assigned.

Figure 6:
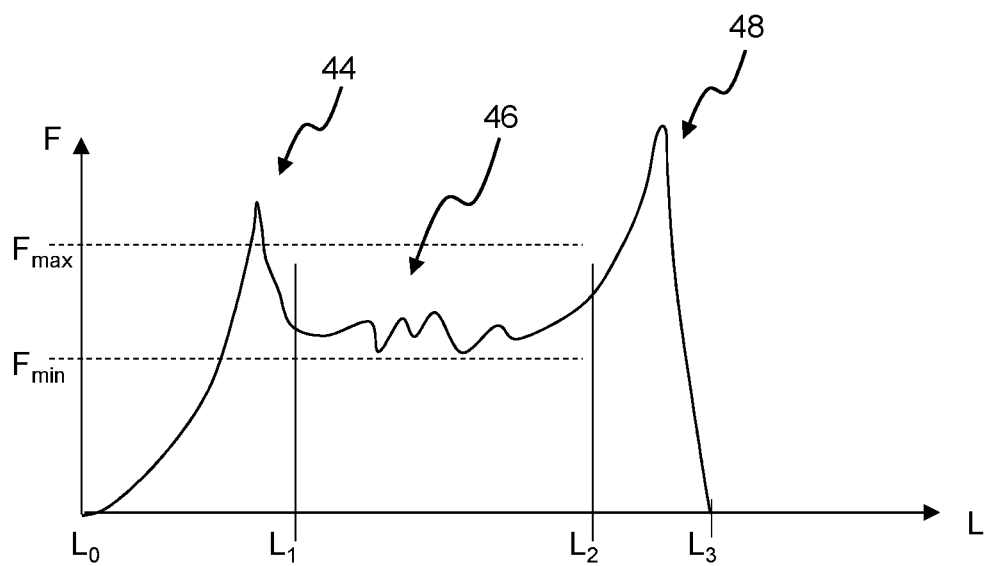
FIG. 6 shows schematically a reference curve of a pull-off force.
Figure 7:
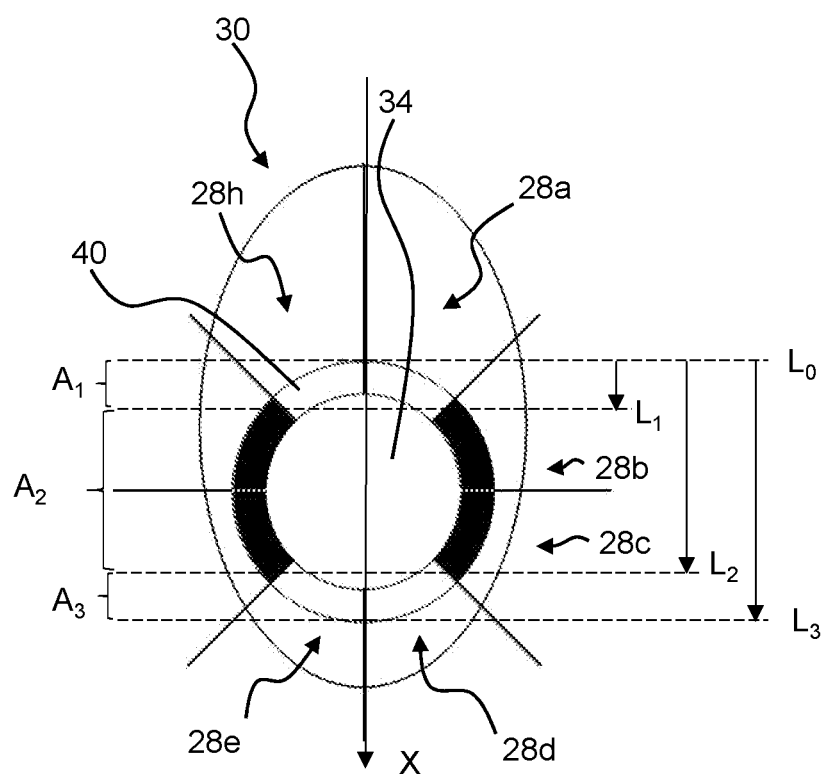
FIG. 7 shows a top view of the formed part of the package according to FIG. 4.

FIG. 6 shows by way of example a force-displacement diagram for the pull-off force F required to pull the lidding film 36 from the formed part 32, wherein the displacement corresponds to the separation length L also indicated in FIG. 7. A conventional pull-off force or peel force curve, as described above, has an initial peak 44, a plateau 46, and a final peak 48. As shown in FIG. 7, the separation length L is preferably defined to be parallel to the pull-off direction X.

The pull-off force curve according to FIG. 6 can be considered a reference curve of a reference package. The reference package can correspond to the package of FIG. 4, wherein the lidding film 36 has been sealed to the formed part 32 along the sealing contour 4 by the use of initial sealing parameters, in particular by the use of a uniform sealing temperature.

FIG. 6 also shows a minimum force $F_{min}$ and a maximum force $F_{max}$. The minimum force $F_{min}$ corresponds to a predetermined pull-off force necessary for a sufficiently strong bond of the lidding film 36 to the formed part 32, in particular to provide a sufficiently leak tight seam 40. The maximum force $F_{max}$ corresponds to a predetermined pull-off force up to which it is possible to remove the lidding film 36 easily from the formed part 32. It can be derived from the diagram that the initial peak 44 and the final peak 48 exceed the maximum force $F_{max}$.

With the method described herein, it is now possible to effectively reduce the pull-off force in areas in which it lies outside of a desired tolerance range, e.g. in the area of the initial peak 44 and of the final peak 48, without simultaneously having the effect of lowering the pull-off force in other areas, such as the area of the plateau 46, below the minimum force $F_{min}$.

Figure 8A:
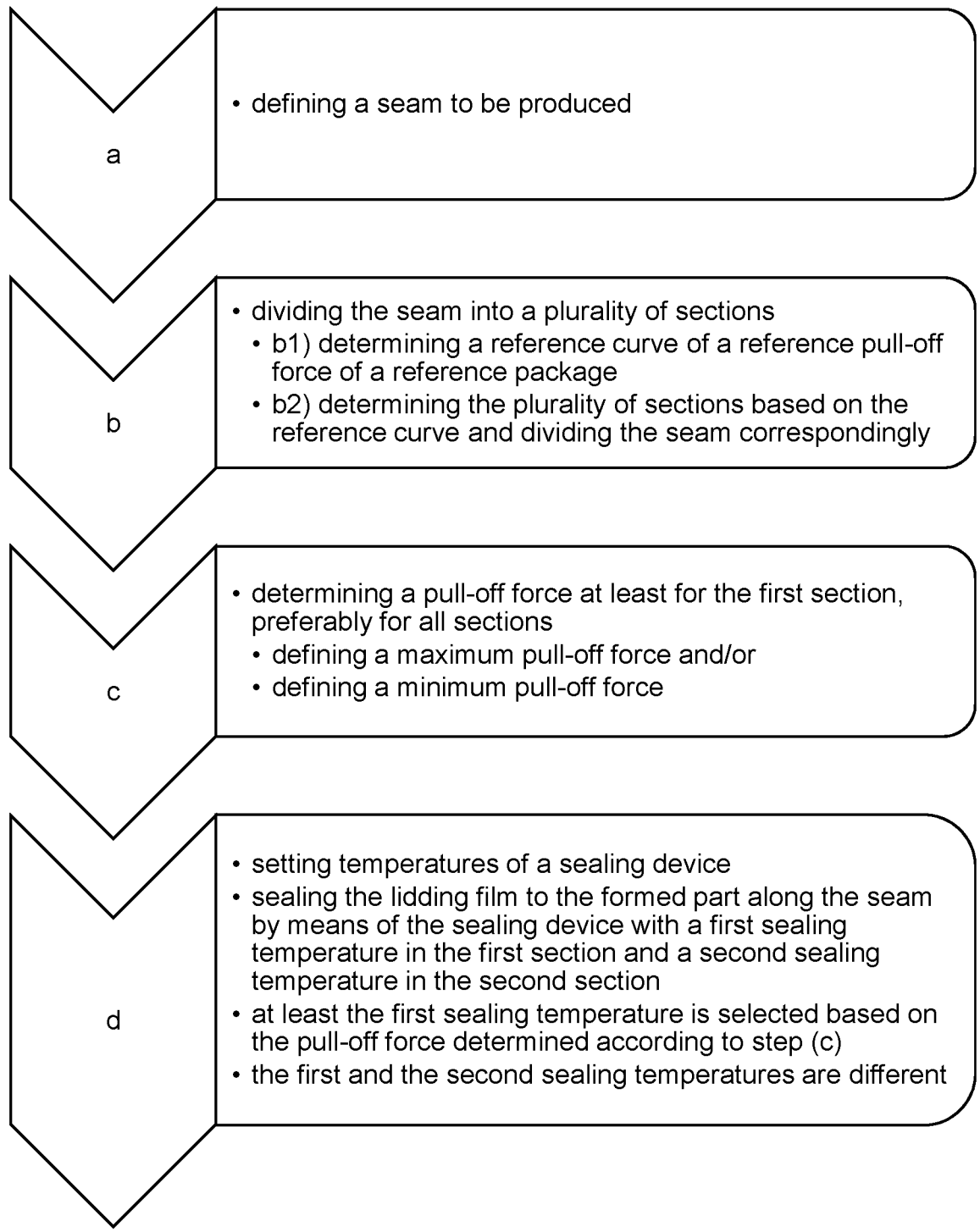
FIGS. 8*a* and 8*b* show flow charts of a method for producing the package.

A method according to an embodiment of the present disclosure is described below with reference to FIGS. 6-8.

First, the seam 40 to be produced and in particular its course around the product cavity 34 and its geometric configuration are defined in step (a), as can be seen for example, in FIGS. 4, 5, and 7. Then the seam 40 to be produced is divided in step (b) into a plurality of sections A1, A2, and A3, which comprise at least a first section A1 and a second section A2 and, in this embodiment, also a third section A3 (see FIG. 7). Dividing the seam 40 into sections A1, A2, and A3 can, for example, be carried out based on empirical values, on the layout of the seam 40, or on a feedback control/optimization process by the control unit 12.

In a preferred embodiment, dividing the seam 40 to be produced according to step (b) is performed on the basis of a reference curve like the one shown in FIG. 6. The reference curve corresponds to a characteristic course of a reference pull-off force of a reference package versus the distance of displacement L (i.e. the separation length) in the pull-off direction X. For this purpose, the reference curve of the reference package may first be determined in step (b1).

Then, the plurality of sections A1, A2, A3 is determined based on the reference curve, and the seam 40 is divided into the plurality of sections A1, A2, A3 (step (b2)). In particular, boundaries between the sections A1, A2, A3 can be defined on the basis of the diagram of the reference curve. For example, a first length $L_1$ of the separation length L is determined in such a way that the initial peak 44 lies between the starting point $L_0$, at which the lidding film is first separated from the formed part, and the first length $L_1$. A second length $L_2$ can be selected in such a way that the plateau 46 lies between the first and second lengths $L_1$, $L_2$. Finally, a third length $L_3$ can be determined in such a way that the final peak 48 lies between the second and third lengths $L_2$, $L_3$. As shown in FIG. 7, the first, second and third lengths $L_1$, $L_2$, $L_3$ can then be transferred to the package 30 and seam 40. In this way, the sections A1, A2, and A3 of the seam 40 are defined in accordance with those areas of the pull-off force on which different requirements are imposed.

As shown seen in FIG. 7, the lengths $L_1$, $L_2$, and $L_3$ can be transferred to the package 30 in the pull-off direction X to determine in this way the sections A1, A2, and A3 of the seam 40. The first section A1 of the seam 40 therefore corresponds to the first length $L_1$ of the separation length, the second section A2 of the seam 40 corresponds to the second length $L_2$ of the separation length, and the third section A3 of the seam 40 corresponds to the third length $L_3$ of the separation length. The first, the second, and the third sections A1, A2, A3 are arranged one behind the other in the pull-off direction X.

From FIGS. 4 and 7 in combination, it can be seen that the first section A1 in this exemplary embodiment is a tear-open section, in which the lidding film 36 is separated first from the formed part 32 to open the package 30 and in the area of which the lidding film 36 preferably comprises the tear-open tab 41. The second section A2 is a pull-off section, in which the lidding film 36 is to be pulled off in the pull-off direction X toward the third section A3. Here, the second section A2 comprises two subsections, i.e. a left and a right section, of the seam 40, which are connected to each other by the first and third sections A1, A3. The third section A3 is an end section, which remains connected to the formed part 32 for the longest period of time during the opening of the package 30, or it could even be permanently connected to the formed part 32.

According to step (c), a pull-off force F for pulling the lidding film 36 from the formed part 32 is determined for at least one section of the plurality of sections A1, A2, A3, wherein at least a first pull-off force F is determined for the first section A1. A pull-off force is preferably determined for each section, i.e., also a second pull-off force F for the section A2 and a third pull-off force for the third section A3.

For this purpose it is possible, according to step (c), to specify in advance a nominal pull-off force and to store it in the system, which can then be used by the control unit 12. Step (c), however, can also comprise the step of defining the maximum pull-off force $F_{max}$. In addition or as an alternative, step (c) can comprise the step of defining the minimum pull-off force $F_{min}$. In the example shown in FIGS. 6 and 7, step (c) comprises defining of a maximum first pull-off force for the first section A1 and a minimum second pull-off force for the second section A2, as previously described.

Figure 8B:
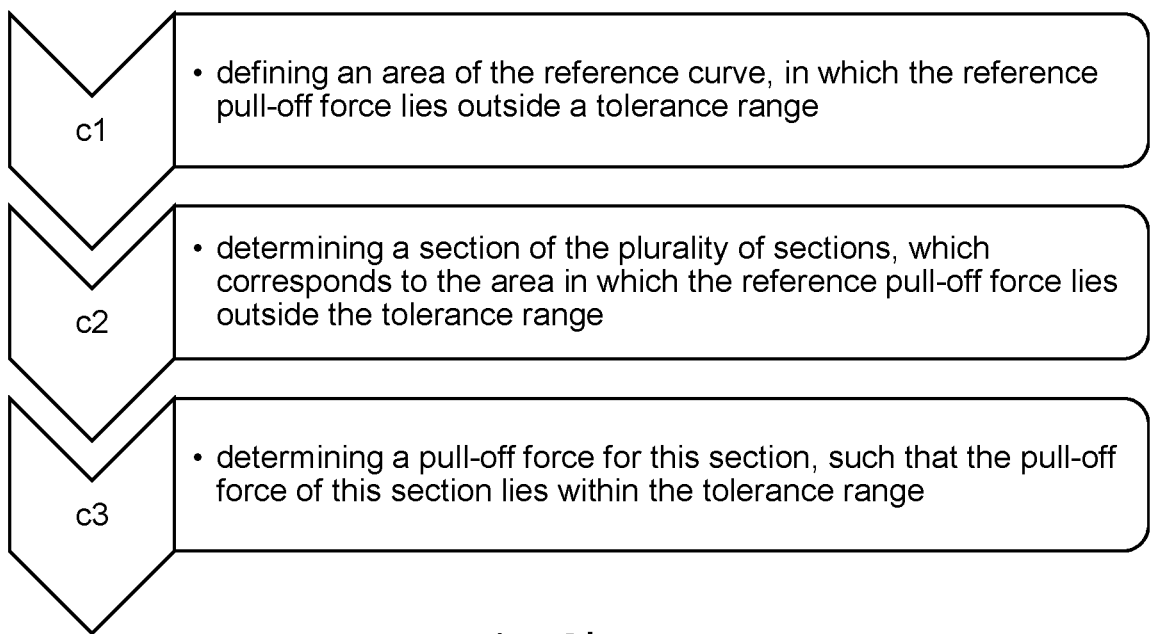

The step of determining the pull-off force for at least one section according to step (c) can also be carried out on the basis of the reference curve (FIG. 6), as shown in FIG. 8b. Step (c) therefore preferably comprises the steps of defining of an area of the reference curve in which the reference pull-off force lies outside a tolerance range (step (c1)) and of determining the section of the plurality of sections A1, A2, A3 of the seam 40 which corresponds to the area in which the reference pull-off force lies outside the tolerance range (step (c2)). For the section determined according to step (c2), a pull-off force which lies within the tolerance range is then determined in step (c3).

For example, the tolerance range can be defined between the minimum and the maximum pull-off forces $F_{min}$, $F_{max}$ (see FIG. 6), and the area of the reference curve lying outside this tolerance range would be the area of the initial peak 44. The first section A1 would be determined accordingly in step (c2), because it corresponds to the area in which the pull-off force comprises the initial peak 44. According to step (c3), a pull-off force is then defined between the minimum and the maximum pull-off forces $F_{min}$, $F_{max}$ for the first section A1.

Now, the lidding film 36 can be sealed to the formed part 32 according to step (d). To do so, sealing temperatures of the sealing device 2 are set. At least for the first section A1 for which the pull-off force has been previously determined according to step (c), the sealing temperature is adjusted based on the pull-off force determined according to step (c). In the present example, therefore, the sealing temperature for the first section A1 is set lower than the sealing temperature of the first section of the reference package in order to obtain a lower sealing strength and thus a lower pull-off force in the first section A1, which preferably lies below the predetermined maximum pull-off force. Because the sealing temperature at least of the first section A1 is changed, the first sealing temperature for the first section A1 and a second sealing temperature for the second section A2 differ from each other. If, in this example, the second sealing temperature in the second section A2 would be decreased as well, there would be the danger of the pull-off force in the second section A2 falling below the minimum pull-off force $F_{min}$.

It can be seen in FIG. 7 that at least a first segment 28a of the sealing contour 4 is assigned to the first section A1, and at least a second segment 28b of the sealing contour 4 is assigned to the second section A2. In addition, the segment 28h may also be assigned to the first section A1, and the segments 28c, f, g may also be assigned to the second section A2. The segments 28d and 28e are assigned here to the third section A3.

Because the sealing temperature can be set individually in each segment 28a-h by means of the plurality of heating elements 22 (see FIG. 3) as described above, setting the sealing temperature of the sealing device 2 comprises the step of setting the sealing temperature of each segment 28a-h. Consequently, each section A1, A2, A3 of the seam 40 can be sealed with an individual sealing temperature as desired.

Once the appropriate settings of the sealing device 2 have been made, the lidding film 36 can be sealed to the formed part 32 along the seam 40 according to step (d). For this purpose, the plurality of segments 28 of the sealing contour 4 are heated in accordance with the set sealing temperatures and brought into contact with the lidding film 36 to seal the lidding film 36 to the formed part 32, thereby forming the seam 40. As a result, the package 30 is produced, the lidding film 36 of which can be separated from the formed part 32 with the desired pull-off force in the pull-off direction X, wherein the pull-off force in the pull-off direction X is adjusted as desired in such a way that a sufficiently strong bond is obtained and the package is easy to open at the same time.

The invention claimed is:

1. A method for producing a package comprising a formed part having at least one product cavity, and a lidding film covering the at least one product cavity, wherein the lidding film is to be pulled off from the formed part in a pull-off direction, wherein the method comprises the steps of:
    (a) defining a seam to be produced, along which the lidding film is to be sealed to the formed part around the at least one product cavity;
    (b) dividing the seam to be produced into a plurality of sections, which comprise a first section, a second section, and a third section,
    wherein the first section, the second section and the third section are arranged one behind the other in the pull-off direction,
    wherein the first section is a tear-open section, in which the lidding film is to be separated first from the formed part to open the package,
    wherein the second section is a pull-off section, in which the lidding film is to be pulled away in the pull-off direction from the first section toward the third section to open the package;
    wherein the third section is an end section, which is arranged behind the first and the second sections with respect to the pull-off direction, and in which the lidding film remains connected to the formed part for the longest period of time during opening of the package;
    (c) determining, at least for the first section of the plurality of sections, a first pull-off force for pulling the lidding film from the formed part;
    (d) sealing the lidding film to the formed part along the seam by means of a sealing device with a first sealing temperature in the first section and a second sealing temperature in the second section, wherein the first and the second sealing temperatures are different, wherein at least the first sealing temperature for the first section is selected based on the first pull-off force determined according to step (c); and wherein a third sealing temperature for the third section differs from the first sealing temperature and/or second sealing temperature.

2. The method according to claim 1, wherein step (c) comprises determining a pull-off force for pulling the lidding film from the formed part for each section of the plurality of sections.

3. The method according to claim 1, wherein step (d) comprises the step of:
setting sealing temperatures of the sealing device for each section of the plurality of sections, wherein at least the first sealing temperature for the first section is set based on the first pull-off force determined according to step (c).

4. The method according to claim 1, wherein the first pull-off force for the first section and/or a second pull-off force for the second section is between 2 N and 20 N.

5. The method according to claim 1, wherein a third pull-off force for the third section is more than 15 N.

6. The method according to claim 1, wherein determining at least the first pull-off force according to step (c) comprises the step of defining a maximum first pull-off force.

7. The method according to claim 1, wherein determining at least the first pull-off force according to step (c) comprises the step of defining a minimum pull-off force.

8. The method according to claim 7, wherein determining at least the first pull-off force according to step (c) further comprises the steps of determining a second pull-off force for the second section and defining a minimum second pull-off force for the second section.

9. The method according to claim 1, wherein the seam around the at least one product cavity has a length which is between 25 mm and 600 mm.

10. The method according to claim 1, wherein the sealing device comprises a sealing contour, which is divided into a plurality of segments, wherein at least a first segment of the plurality of segments is assigned to the first section of the seam and at least a second segment of the plurality of segments is assigned to the second section of the seam, and step (d) comprises the step of heating the plurality of segments in accordance with the first and second sealing temperatures.

11. The method according to claim 10, wherein the plurality of segments of the sealing contour comprises at least four segments.

12. The method according to claim 10, wherein the sealing device comprises a plurality of heating elements, wherein one heating element of the plurality of heating elements is assigned to each segment of the plurality of segments, wherein the step of heating the plurality of segments is performed by means of the plurality of heating elements.

13. The method according to claim 1, wherein the sections of the plurality of sections of the seam are arranged adjacent to each other and continuously along the seam, wherein the sealing according to step (d) is performed along the entire seam around the at least one product cavity.

14. A method for producing a package comprising a formed part having at least one product cavity, and a lidding film covering the at least one product cavity, wherein the method comprises the steps of:
(a) defining a seam to be produced, along which the lidding film is to be sealed to the formed part around the at least one product cavity;
(b) dividing the seam to be produced into a plurality of sections, which comprise at least a first section and a second section of the plurality of sections;
(c) determining, at least for the first section of the plurality of sections, a first pull-off force for pulling the lidding film from the formed part;
(d) sealing the lidding film to the formed part along the seam by means of a sealing device with a first sealing temperature in the first section and a second sealing temperature in the second section, wherein the first and the second sealing temperatures are different, and wherein at least the first sealing temperature for the first section is selected based on the first pull-off force determined according to step (c);
wherein step (b) comprises the steps of:
(b1) determining a reference curve, which is characteristic of a change in a reference pull-off force of a reference package versus a separation length in the pull-off direction;
(b2) determining the plurality of sections on the basis of the reference curve and dividing the seam into the plurality of sections correspondingly.

15. The method according to claim 14, wherein step (c) comprises the steps of:
(c1) defining an area of the reference curve, in which the reference pull-off force lies outside a tolerance range;
(c2) determining the first section of the plurality of sections of the seam, which corresponds to the area in which the reference pull-off force lies outside the tolerance range; and
(c3) determining the first pull-off force for the first section of the seam determined according to step (c2), such that the first pull-off force of the first section lies within the tolerance range.

* * * * *